Dec. 2, 1930.  A. J. EVANS  1,783,780
DRIVING GEAR MECHANISM FOR MOTOR VEHICLES
Filed May 4, 1927   3 Sheets-Sheet 1

INVENTOR.
AMOS J. EVANS.
BY HIS ATTORNEYS,
Williamson Reif & Williamson

Dec. 2, 1930.  A. J. EVANS  1,783,780
DRIVING GEAR MECHANISM FOR MOTOR VEHICLES
Filed May 4, 1927   3 Sheets-Sheet 2

INVENTOR.
AMOS J. EVANS.
BY HIS ATTORNEYS.
Williamson Reith Williamson

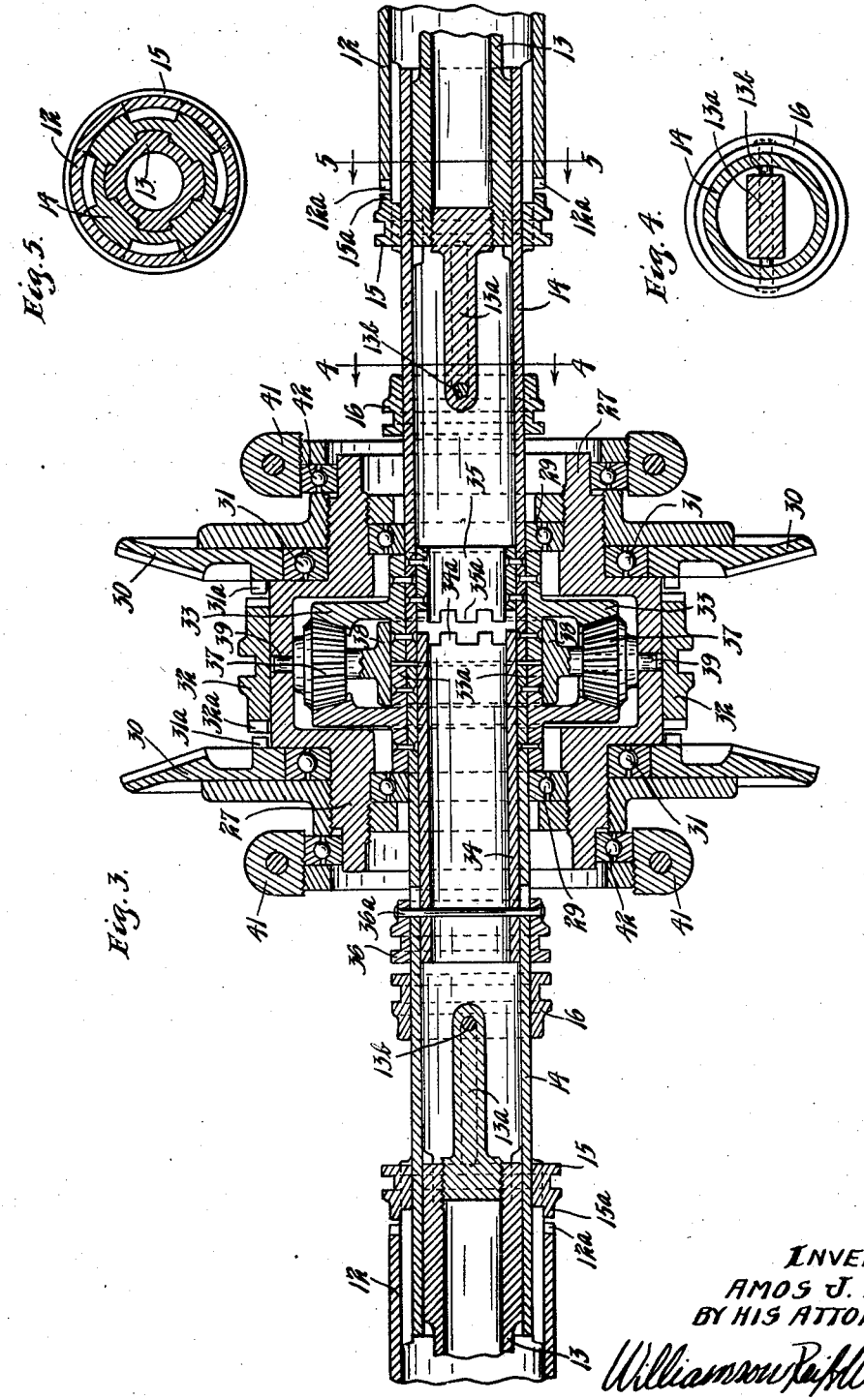

Patented Dec. 2, 1930

1,783,780

UNITED STATES PATENT OFFICE

AMOS J. EVANS, OF MINNEAPOLIS, MINNESOTA

DRIVING-GEAR MECHANISM FOR MOTOR VEHICLES

Application filed May 4, 1927. Serial No. 188,840.

This invention relates to variable speed driving gear mechanism for motor vehicles and especially for motor vehicles where heavy traction is needed. The invention is especially adapted for use in heavy trucks, tractors and busses wherein the strain on the propelling shaft and differential elements is exceedingly great.

An important object of my invention is to provide a simple but highly efficient driving gear mechanism associated with the axle and differential structure of a motor vehicle, whereby great variety may be obtained in the gear ratios at which the two traction wheels are driven and whereby the greater part of the driving strain will be removed from the propeller shaft and differential elements and will be distributed upon heavy driving elements mounted in the wheel structure.

A further object of my invention is to provide variable speed driving gear mechanism interposed between the differential and the wheels of a motor driven vehicle whereby each of the wheels may be driven at a plurality of speeds relative to the propelling shaft and whereby a plurality of resultant speeds or gear ratios will be obtainable through the differential mechanism and its connection with the wheels.

Another object is to provide in structures of the class described planetary transmission mechanism disposed in the traction wheel structure and connected for variable driving with the differential elements by means of concentric jack tubes or sleeves disposed within the axle housing.

A still further object is to provide in driving gear mechanism of the class described, means for locking together the planetary gear mechanism for the two fraction wheels and means for reversing the movement of the wheels.

Another object is to provide in such a device, means for efficiently lubricating the working parts isolated from the brake side of the wheel in such a manner that the lubricant cannot work its way to any of the braking elements.

These and other objects and advantages of the invention will be apparent from the following description made in connection with the accompanying drawings, in which like reference characters refer to similar parts throughout the several views, and in which:

Fig. 3 is a horizontal longitudinal section on a larger scale of a specific form of differential mechanism used, and its connection with the jack tubes of my transmission system;

Fig. 4 is a cross section taken on the line 4—4 of Fig. 3; and

Fig. 5 is a cross section taken on the line 5—5 of Fig. 3.

Figure 1:
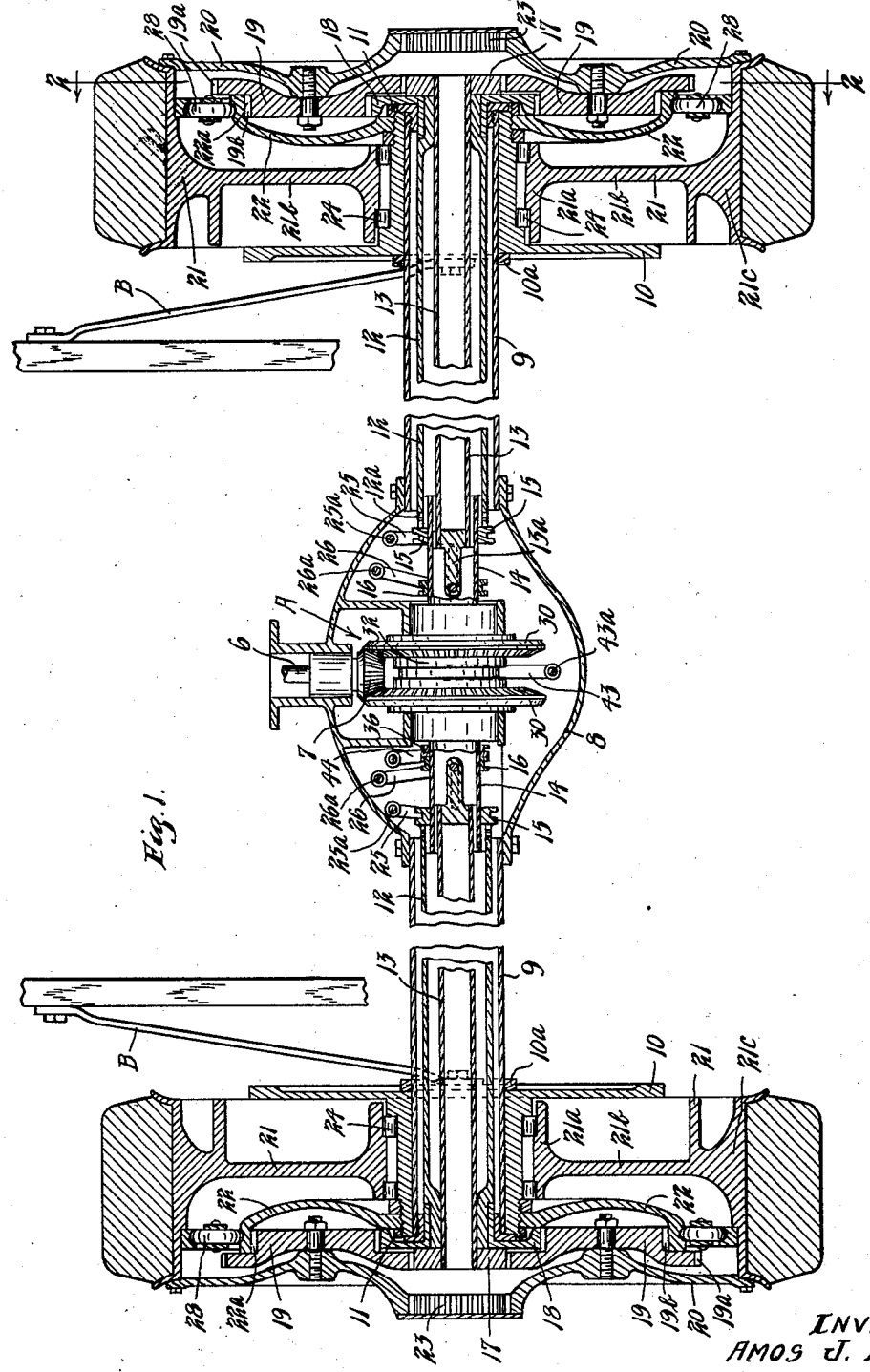
Fig. 1 is a horizontal longitudinal section of a preferred embodiment of my axle and wheel structure.
Figure 2:
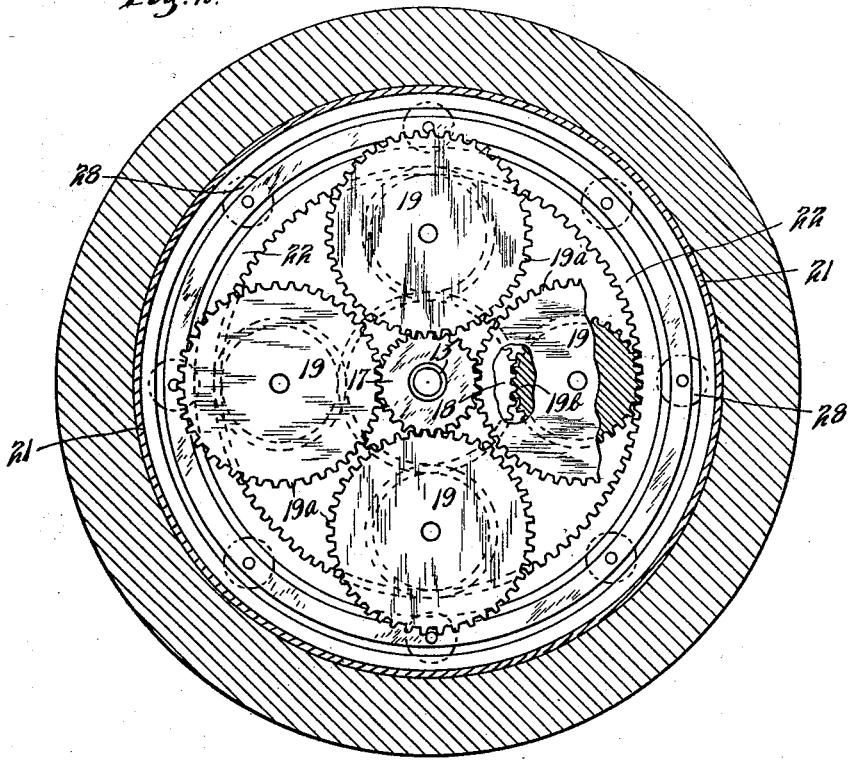
Fig. 2 is a cross section of the planetary gear system, taken on the line 2—2 of Fig. 1.

In the drawings, a special type of differential mechanism, to be later described, is indicated as an entirety by the letter A connected for driving with the driving or propeller shaft 6 by means of bevel pinion 7. A suitable differential housing 8, having the usual removable inspection plates is provided, enclosing the differential A and its connections with the driving members in my axle structure. Differential case 8 is secured at its ends to the tubular axle housings 9 which extend through the wheel structures and are rigidly connected to the heavy flanged sleeves or bushings 10. As shown, the flange sleeved members 10 are slipped over the ends of axle housings 9 abutting against stop shoulders 10a and retaining rings 11 threadedly and interiorly engage the outer ends of said axle housings, clamping sleeves 10 in co-operation with shoulders 10a. Suitable torque arms B rigidly connect sleeves 10 with the frame of the vehicle positively holding said sleeves against rotation upon the axle housing 9. Outer and inner jack tubes 12 and 13 are housed within each of the axle housings 9, said tubes being concentrically disposed, and inner jack tubes 13 being longitudinally slidable within outer jack tubes 12 and within the differential driving sleeves 14.

The wheel structure, planetary gear mechanism and driving connections between the differential and the wheels is the same for each of the traction wheels and to simplify my description, said parts for one of the traction wheels only will be described. The outer jack tube 12 is loosely mounted on the outer extremity of driving sleeve 14 and is provided at its inner peripheral edge with a plurality of dogs 12a adapted to mesh for driving, with dogs 15a of shipper collar 15 which is splined on driving sleeve 14.

Inner jack tube 13 is splined with the interior of differential driving sleeve 14 and is also connected to sleeve 14 by means of slot and pin engagement between a tongue 13a, secured to the inner extremity of said jack tube and a suitable shipper collar 16 loosely mounted on the exterior of driving sleeve 14. Elongated slots indicated in dotted lines in Figs. 1 and 3 are provided for the accommodation of the pins 13b whereby said inner jack tube is capable of considerable longitudinal movement. The outer extremity of inner jack tube 13 carries the relatively small driving pinion 17 capable of being disposed in three positions; one for direct driving, one for low speed driving and an intermediate or neutral position, as will later be explained.

Outer jack tube 12 carries at its outer end disposed within the wheel structure the relatively large pinion 18 concentric with the wheel, said pinion having engagement with a plurality of planetary gears 19, said gears being pivotally mounted on the inner side of a relatively large concavo-convex disc member 20. Planetary gears 19 are each provided with a relatively large and a relatively small cog 19a and 19b respectively and the smaller cogs 19b are constantly in mesh with the larger pinion 18 secured to the outer jack tube. Disc 20 is rigidly secured to the heavy wheel body 21 in order that said wheel may be driven about the heavy bushing or sleeve member 10. Circumferentially spaced rollers 28 may be provided mounted from the inner periphery of the wheel felly 21c engaging a race on the external periphery of the internal gear 22a.

A heavy disc member 22 carrying a large internal gear 22a is disposed in the wheel structure concentric with jack tubes 12 and 13 and rigidly secured to the flanged bushing 10. This internal gear is also in constant mesh with the smaller cogs 19b of planetary gears 19. It will be seen that when outer jack tube 12 is driveably connected with differential driving sleeve 14 by means of the engagement of dogs 12a and 15a, the wheel will be driven through pinion 18, through planetary gears 19 in mesh with internal gear 22a, thereby driving disc 20 which is rigidly connected to the frame of the wheel. Before the wheels are driven by outer jack tube 12, inner jack tube 13 must be moved longitudinally by shipper collar 17 into neutral position, intermediate between the position shown in the drawings, and the extreme position where pinions 15 mesh with the heavy internal clutch members 23 mounted within the boss portion of disc 20. The traction wheel is, of course, driven at an intermediate speed through its driving connection with outer jack tube 12.

The wheel may be driven at two different speeds by inner jack tube 13. When tube 13 is longitudinally moved to extreme outer position, pinion 17 will engage clutch member 23 and the traction wheel will be directly driven at high speed. Low speed for each of the traction wheels is obtained when inner tube 13 is disposed in extreme inward position, as shown in the drawings, driving pinion 17 being at that time meshed with the larger cogs 19a of planetary gears 19. When so engaged gears 19 will be caused to travel around the heavy internal gear 22a revolving disc 20 and driving the wheels at low speed.

Shipper collars 15 and 16 may be actuated to connect the outer and inner jack tubes respectively for driving the wheels by any suitable mechanism, such as the shipper arms 25 and 26 respectively, rigidly connected to short vertical rock shafts 25a and 26a which may be journaled in the differential housing 8. Suitable apparatus (not shown) of the selective shift lever type may be connected with the rock shafts 25a and 26a to permit the driver of the motor vehicle to conveniently control the driving of the traction wheels.

The body of the traction wheel includes a heavy hub portion 21a encircling the bushing 10, (suitable roller bearings 24 being provided between said parts) the web portions 21b, and the felly portions 21c carrying the tires. It will be noticed that the wheel body is so constructed to afford a large recess of considerable depth to accommodate the planetary gear mechanism, and that said recess is closed by means of disc member 20 which is rigidly secured to the felly portion of the wheel. On the inner side of the wheel body a relatively large annular recess is formed concentric with the axis of the wheel, wherein the brake mechanism for the wheels may be housed, said recess being entirely isolated from the planetary gear mechanism by means of web 21b and felly 21c.

My differential mechanism not only is connected for driving the inner and outer jack tubes, but includes means for locking the driving gear mechanism of the two traction wheels together to prevent the equalizing effect of the differential and also includes means for reversing the movement of the traction wheels. A heavy spider case 27 is employed, rotatably mounted on the differential driving sleeves 14 by means of suitable ball bearings 29. A pair of oppositely disposed ring gears 30 are loosely mounted about spider case 27, suitable ball bearings 31 being provided. Ring gears 30 are both meshed with the driving pinion 7 of the propeller shaft and are driven in opposite directions. A relatively large shipper collar 32 is splined to the medial portion of spider case 27 carrying at each of its peripheral edges, dogs 32a adapted to mesh with dogs 31a on said ring gears. Spider case 27 contains the usual differential gears 33 which are rigidly secured to the differential driving sleeves 14. One of the differential driving sleeves 14 has a slidable sleeve 34 telescoped within the inner end thereof, said slidable sleeve being connected with said driving sleeve by pin and slot engagement. Sleeve 34 is provided with dogs at its inner end adapted to engage dogs 35a of a short sleeve 35 rigidly telescoped within the inner end of the other differential driving sleeve 14. The engagement of said dogs is effected by means of a suitable shipper collar 36 loosely mounted on said first mentioned driving sleeve and connected with said inner sleeve 34 by means of pins 36a, said pins working in suitable slots provided in driving sleeve 14. A plurality of radially disposed differential pinions 37 are mounted in the usual manner on the spider 38, said pinions being in mesh with differential gears 33 and having outwardly projecting shafts or pins 39 journaled in circumferentially spaced recesses or seats provided on the interior of the spider casing. The hub of spider 38 is journaled on the opposing annular flanges 33a of the differential gears. Suitable anchoring members 41 support the spider casing 27 from the differential housing 8, ball bearings 42 being provided between said anchoring members and the ends of said spider case. Shipper collar 32, for drivably connecting the ring gears 30 with the spider casing, may be shifted by any suitable means, such as the shipper arm 43 rigidly secured to the vertical rock shaft 43a journaled in the rear portion of the differential housing. Shipper collar 36 may be shifted to lock driving sleeves 14 together by similar shipper mechanism 44 mounted on a vertical shaft also journaled in the differential housing.

*Operation*

The operation of my mechanism may be briefly summarized as follows:—

In Fig. 1 the inner jack tubes 13 are shown disposed in extreme inward position with their driving pinion 17 meshed with the larger cogs of planetary gears 19. Discs 20 and the wheels will be driven at low speed by means of the planetary gear mechanism, pinions 17 in co-operation with internal gears 22 greatly reducing the gear ratio. It will be seen that the greater portion of the driving strain will be received by the heavy internal gear 22a and the heavy planetary gears, and that only a relatively small amount of strain will be put upon the differential and propeller shaft, since all gear reduction takes place in the elements within the wheel structure. The heavy torque arms B relieve the ends of the axle housing 9 of all the driving strain. These heavy arms are rigidly secured to the flanges of sleeves 10 and to the chassis frame of the vehicle.

When inner jack tubes 13 are projected to extreme outward position, pinions 17 will mesh with clutch members 23 and disc 20 and the wheel will be driven in high speed directly from the differential driving sleeves. The planetary gear mechanism will idle in this speed.

When the driving pinions 17 are disposed in neutral or intermediate position and the outer jack tubes 12 are driven by interlocking dogs 12a and 15a, an intermediate speed on both traction wheels will be obtained through the larger driving pinions 18, which mesh with the smaller cogs on planetary gears 19 in co-operation with the internal gear 22a to cause the discs 20 and wheels to be driven at a speed intermediate to the speeds previously described. In this speed it will again be seen that a large amount of the driving strain is placed upon the heavy internal gears 22a and the other driving elements within the wheel structure.

It is often desirable where traction can be obtained by one of the driving wheels, but not by the other, to lock the differential driving sleeves together. This may be easily accomplished by shifting shipper collar 36 to cause elements 34 and 35 to interlock.

Several resultant speeds may be obtained through the action of the differential mechanism when one of the wheels is driven at one speed and the other wheel is driven at a different speed. For example, assuming the right wheel driven at low speed through the inner jack tube and the left wheel driven at an intermediate speed by the outer jack tube, when the differential driving sleeves are not interlocked, a resultant speed, intermediate of low and intermediate speeds will be obtained. Such resultant speeds are often desirable in heavy trucks and tractors.

The oppositely disposed ring gears 30 permit all of the speeds described to be obtained either in forward or reverse, it being only necessary to shift collar 32 by means of rock shaft 43a to engage said collar with one or the other of said ring gears.

In many motor vehicles it will be desirable to only use the inner jack tube driving gear structure, while in the heavier types, where more variation in the gear speed ratios is desired both the inner and outer jack tubes may be utilized.

The large annular recesses within which the several driving elements of the planetary gear systems are housed constitute efficient lubricating chambers and are completely isolated from the opposite side of the body of the wheel. Thus, the several driving parts may be efficiently lubricated and oil and grease cannot work its way to the brake mechanism which is housed within the annular recess disposed at the inner sides of the wheels. The torque arms B and axle housings 9 hold the heavy bushings 10 and large internal gear 22a rigid and receive the greater part of the driving strain.

It will, of course, be understood that various changes may be made in the form, details, arrangement and proportion of parts without departing from the scope of the invention.

To replace either the inner and outer jack tubes 13 and 12 respectively, it is only necessary to remove the heavy disc 20 from the felly of the wheel by loosening the anchoring bolts or other retaining means employed, unfasten the pins 13b, which slidably secure the tongues of the inner jack tubes 13 to the differential driving sleeves 14 and withdraw the jack tubes from the open side of the wheel. This can all be accomplished without removing the wheel from the axle housing or without jacking up the wheel.

What is claimed is:

1. In combination with the differential mechanism and a traction wheel of a motor vehicle, a tubular driving axle connectable with said differential and carrying a driving element adjacent its outer end, a second driving axle concentrically disposed within said first mentioned axle connected to said differential and also carrying a driving element adjacent its outer end, a fixed transmission element, transmission elements carried by said wheel adapted to be driven either by said outer axle or by said inner axle, and means for connecting said outer and inner axles for driving with said transmission elements, whereby the wheel may may be driven at a plurality of different speeds.

2. In combination with the differential mechanism, axle housing and a traction wheel of a motor vehicle, said wheel having a disc, a tubular driving axle connectable for driving with said differential and carrying a driving element adjacent its outer end, a second driving axle concentrically disposed within said tubular driving axle and adapted to be connected for driving with said differential and also carrying a driving element adjacent its outer end, a plurality of double planetary members mounted on the disc of said wheel, each of said double members having a gear adapted to be connected with the driving element of said first mentioned driving axle and a gear adapted to be engaged with the driving element of said second driving axle.

3. In combination with the differential mechanism, axle housing and traction wheel of a motor vehicle, said wheel having an outer disc, a tubular driving axle connectable for driving with the differential mechanism, a driving element adjacent the outer end of said axle, a second driving axle concentrically disposed within said first mentioned tubular axle and adapted to be connected for driving with said differential mechanism, a large stationary internal gear mounted at the outer end of said axle housing, planetary double gear members carried by said disc, each having a smaller gear meshed with said stationary internal gear and each having a larger gear, said smaller gears being also in mesh with the driving element of said first mentioned tubular driving axle, and means for engaging the driving element of said second driving axle with the larger gears of said double gear elements.

4. In combination with the differential mechanism, an axle housing and a traction wheel of a motor vehicle, said wheel having an outer disc, a driving axle connectable for driving with said differential mechanism and carrying at its outer end a driving member, a relatively large stationary internal gear mounted on the outer end of said axle housing, a plurality of double planetary gear members mounted on said wheel disc and each having a relatively small gear in constant mesh with said internal gear and each having a relatively large gear, a concentric clutch element carried by said wheel plate in alinement with the driving member of said driving axle, and means for moving said driving element into mesh with the larger gears of said several double planetary members or with said clutch element to cause said wheel to be driven at two different speeds.

5. In combination with the differential mechanism, the axle housing and a traction wheel of a motor vehicle, a driving axle connectable for driving with said differential mechanism and carrying at its outer end a driving member, said traction wheel comprising a heavy disc carrying a felly and having a hub rotatably mounted on bearings which extend circumferentially about the outer end of said axle housing, a stationary disc mounted on the outer end of said axle housing within the felly of said wheel and having a large internal gear therein, an outer plate carried by said wheel, planetary gear mechanism carried by said outer plate and in constant mesh with said internal gear, a disc for said internal gear having a cylindrical flange spaced from the felly of the wheel and bearings between said felly and said flange.

6. Driving gear mechanism for motor vehicles having in combination a differential mechanism provided with the usual ring gears, differential driving sleeves affixed to the respective ring gears, and independent transmission mechanism for driving each wheel at a plurality of speeds connected with said differential driving sleeves, a locking element affixed within one of said differential driving sleeves and a complementary locking element within the other differential driving sleeve non-rotatively connected therewith but mounted for longitudinal sliding movement and operating means for interlocking said locking elements to cause said wheels to be positively driven without the effect of the differential mechanism when desired.

In testimony whereof I affix my signature.

AMOS J. EVANS.